(12) United States Patent
Urban

(10) Patent No.: US 11,193,044 B2
(45) Date of Patent: Dec. 7, 2021

(54) SLURRY COMPOSITION AND METHOD OF SELECTIVE SILICA POLISHING

(71) Applicant: Ferro Corporation, Mayfield Heights, OH (US)

(72) Inventor: Nathaniel D. Urban, Canadaigua, NY (US)

(73) Assignee: Ferro Corporation, Mayfield Heights, OH (US)

( * ) Notice: Subject to any disclaimer, the term of this patent is extended or adjusted under 35 U.S.C. 154(b) by 331 days.

(21) Appl. No.: 16/305,114

(22) PCT Filed: Aug. 2, 2017

(86) PCT No.: PCT/US2017/045066
§ 371 (c)(1),
(2) Date: Nov. 28, 2018

(87) PCT Pub. No.: WO2018/038885
PCT Pub. Date: Mar. 1, 2018

(65) Prior Publication Data
US 2020/0079975 A1 Mar. 12, 2020

Related U.S. Application Data

(60) Provisional application No. 62/379,916, filed on Aug. 26, 2016.

(51) Int. Cl.
*C09G 1/02* (2006.01)
*B24B 37/04* (2012.01)

(52) U.S. Cl.
CPC .............. *C09G 1/02* (2013.01); *B24B 37/044* (2013.01)

(58) Field of Classification Search
None
See application file for complete search history.

(56) References Cited

U.S. PATENT DOCUMENTS

| | | | |
|---|---|---|---|
| 4,222,747 A | 9/1980 | Dauguet et al. | |
| 6,303,506 B1 * | 10/2001 | Nojo | H01L 21/31053 438/692 |
| 6,491,843 B1 | 12/2002 | Srinivasan et al. | |
| 6,508,953 B1 | 1/2003 | Li et al. | |
| 6,596,042 B1 | 7/2003 | Feng et al. | |
| 6,616,514 B1 | 9/2003 | Edelbach et al. | |
| 6,660,639 B2 | 12/2003 | Li et al. | |
| 6,702,954 B1 | 3/2004 | Her et al. | |
| 6,818,030 B2 | 11/2004 | Feng et al. | |
| 7,091,164 B2 | 8/2006 | Srinivasan et al. | |
| 7,101,800 B2 | 9/2006 | Her et al. | |
| 7,294,044 B2 | 11/2007 | Ferranti | |
| 7,300,478 B2 | 11/2007 | Ferranti et al. | |
| 7,666,239 B2 | 2/2010 | Feng et al. | |
| 7,687,401 B2 | 3/2010 | Feng et al. | |
| 7,708,788 B2 | 5/2010 | Yoshida et al. | |
| 8,409,990 B2 | 4/2013 | Kraft | |
| 8,449,652 B2 | 5/2013 | Radosz et al. | |
| 9,443,739 B2 | 9/2016 | Noller et al. | |
| 2004/0023491 A1 * | 2/2004 | Lim | H01L 21/76819 438/689 |
| 2004/0152309 A1 | 8/2004 | Carter et al. | |
| 2005/0028450 A1 * | 2/2005 | Xu | C09G 1/02 51/309 |
| 2006/0014390 A1 * | 1/2006 | Lee | H01L 21/7684 438/692 |
| 2006/0030154 A1 * | 2/2006 | MacDonald | H01L 21/31053 438/690 |
| 2008/0104893 A1 | 5/2008 | Oh | |
| 2010/0003897 A1 * | 1/2010 | Kim | C09G 1/02 451/41 |
| 2010/0015729 A1 * | 1/2010 | Choi | H01L 21/3105 438/3 |
| 2017/0204293 A1 | 7/2017 | Megherhi et al. | |

FOREIGN PATENT DOCUMENTS

| | | | |
|---|---|---|---|
| CN | 103805069 A | 5/2014 | |
| JP | 2008-117807 A | 5/2008 | |
| JP | 2008117807 A * | 5/2008 | ............... C09G 1/02 |
| JP | 2008-181954 A | 8/2008 | |
| JP | 2009-135199 A | 6/2009 | |
| JP | 2009-289885 A | 12/2009 | |
| WO | WO 2006/026064 A2 | 3/2006 | |
| WO | 2010/087849 A1 | 8/2010 | |
| WO | WO 2013/018015 A2 | 2/2013 | |

OTHER PUBLICATIONS

Chinese Office Action dated May 7, 2020, 9 pages.
Japanese Office Action dated Mar. 3, 2020, 4 pages.
Singapore Written Opinion dated Mar. 25, 2020, 7 pages.
Korean Notice of Preliminary Rejection dated Jun. 15, 2020, 8 pages.
Espacenet bibliographic data for CN103805069 published May 21, 2014, one page.
International Search Report for corresponding PCT/US2017/045066 dated Nov. 9, 2017, one page.

* cited by examiner

*Primary Examiner* — Shamim Ahmed
(74) *Attorney, Agent, or Firm* — Rankin, Hill & Clark LLP; Christopher Jan Korff

(57) ABSTRACT

An acidic slurry composition for use in chemical-mechanical polishing including an acid pH adjuster and a cationic polishing suppressant comprising a quaternized aromatic heterocycle. The quaternized aromatic heterocycle imparts a polishing selectivity of silica over crystalline silicon of at least 100.

9 Claims, No Drawings

SLURRY COMPOSITION AND METHOD OF SELECTIVE SILICA POLISHING

FIELD OF INVENTION

The present invention relates to a slurry composition for use in chemical-mechanical polishing substrates containing silica and crystalline silicon and a method of using the slurry composition.

DESCRIPTION OF RELATED ART

Prior art chemical mechanical polishing slurries exhibited poor selectivity between silica (silicon dioxide) and polysilicon (crystalline silicon).

As industry continues to seek improvement in production throughput in order to increase cost effectiveness, higher polishing selectivity of silica to polysilicon using various abrasives while achieving high surface quality became highly desirable.

BRIEF SUMMARY OF THE INVENTION

The present invention provides a method to increase the selectivity of polish rates of silica (silicon dioxide) in preference to polysilicon. The method involves an acidic aqueous slurry containing a polishing suppressant which comprises a cationic organic compound. In particular, the cationic organic compound is or contains a quaternized aromatic heterocycle.

The slurry compositions according to the invention are acidic. Polysilicon is known in the art to decompose by hydrolysis when exposed to neutral and alkaline aqueous environments. These environments can be defined as aqueous solutions with pH values of 7 and higher. It is possible that this behavior is exhibited at pH levels slightly below 7. In an aqueous environment of pH 7 and higher, polysilicon decomposes by hydrolysis and forms silicon hydroxide. In the same aqueous environment of pH 7 and higher, silica also forms silicon hydroxide. Therefore, selective polishing of silica in preference to polysilicon with selectivity greater than 50 becomes difficult in an aqueous environment of pH 7 and higher. This is because both silica and polysilicon start decomposing and essentially converting to the same material—silicon hydroxide.

The slurry composition according to the invention can be used to polish heterogeneous substrate surfaces including silica and polysilicon with a preference (selectivity) of silica to polysilicon that can be at least 50, at least 75, at least 100, at least 125, at least 150, or at least 175. Values higher than, or between, the aforementioned values are also envisioned.

The present invention also provides a method of polishing heterogeneous substrate surfaces using the slurry composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a method to increase the selectivity of polish rates of silica in preference to polysilicon. The method involves an aqueous slurry containing a polishing suppressant which includes a cationic organic compound. In particular, the cationic organic compound is or contains a quaternized aromatic heterocycle.

The present invention provides an acidic aqueous polishing slurry composition that comprises water (preferably deionized water), ceria particles, a pH adjuster, and an agent that suppresses the polishing rate of polysilicon in preference to silica. The agent that improves polishing selectivity of silica over polysilicon is a suppressant to decrease the absolute polishing rate of polysilicon while leaving the polishing rate of silica largely unchanged thereby increasing the polishing selectivity of silica to polysilicon on the order of 100 fold. The pH adjuster is present in the slurry to an extent needed to bring the pH down to 5.5 or below; preferably to 5 or below, more preferably to 4.5 or below, and still more preferably to 4 or below.

The quaternized aromatic heterocycle includes a heterocyclic aromatic ring structure, or multiple ring structures, either fused or separated from one another by at least one atom that is not part of either of the ring structures.

The quaternized aromatic heterocycle includes at least one atom that is capable of exhibiting a quaternary state. Non-limiting examples of such atoms include nitrogen (ammonium) and phosphorous (phosphonium). There is no limit to the molecular weight of the compound. The compound can be polymeric or oligomeric in nature or include low molecular weight species. The compound can include one quaternary site or multiple sites with no limitation. There is no limitation to the length or structure of the pendant groups. The quaternary (positively charged—cationic) atom is balanced with a negatively charged anion. There is no limitation to the negatively charged anion. Typical but not limiting anions include hydroxide, chloride, bromide, iodide, nitrate, sulfate, and phosphate.

The slurry composition according to this invention can be used to polish heterogeneous substrate surfaces including silica and polysilicon with a preference of silica to polysilicon that can be at least 50, at least 75, at least 100, at least 125, at least 150, or at least 175. Values greater than, and between, the aforementioned values are also envisioned.

The present invention also provides a method of polishing a heterogeneous substrate surface using the slurry composition.

Each of the components of the slurry composition is separately discussed below.

Abrasive Particles. The slurry composition preferably comprises from about 0.05% to about 30% by weight, preferably about 0.05 to 20% by weight, and more preferably from about 0.1% to about 7% by weight, of abrasive particles.

Non-limiting examples of suitable abrasive particles include ceria, alumina, zirconia, silica, and/or titania.

The abrasive particles used in the slurry composition according to the invention preferably have an average particle size ($D_{mean}$) of from about 0.001 μm to about 3.0 μm. More preferably, the particles have an average particle size ($D_{mean}$) within the range of from about 0.05 μm to about 1.0 μm.

Polishing Suppressant. The slurry composition preferably comprises one or more suppressants in an amount within the range of from about 0.1 to about 30%, preferably about 0.25 to 25%, more preferably about 0.5 to about 20% by weight of the total solids present in the slurry composition.

Suitable suppressants for use to improve the polishing selectivity of silica over polysilicon are, broadly speaking, cationic organic compounds. The cationic organic compounds of interest in the present invention are quaternized aromatic heterocycles.

The quaternized aromatic heterocycle may include 4-8 atoms, preferably 5 or 6 atoms, most preferably 6 atoms. The quaternized aromatic heterocycle includes at least one heteroatom capable of achieving a quaternary state. Non-limiting examples of atoms capable of achieving a quaternary state include nitrogen and phosphorous.

The quaternized aromatic heterocycle may further include at least one saturated or unsaturated, optionally substituted C1 to C100 hydrocarbon residue bonded to at least one atom of the heterocycle. In various embodiments, the hydrocarbon residue may have 1-75, 1-50, or 1-25 carbon atoms. Preferably, the hydrocarbon residue has 1 to 24 carbon atoms, or 1-18 or 1-12 or 1-6 carbon atoms.

The quaternized aromatic heterocycle may be part of an ionic liquid. An ionic liquid is a salt in which the ions are poorly coordinated, which results in these solvents being liquid below 100° C., or even at room temperature (room temperature ionic liquids, RTILs).

There is no limit to the molecular weight of the compound. The compound can be polymeric or oligomeric in nature or include low molecular weight species. The compound can include one quaternary site or multiple sites with no limitation. There is no limitation to the length or structure of the pendant groups. The quaternary (cationic) atom is balanced with a negatively charged anion. There is no limitation to the negatively charged anion. Typical non-limiting anions include hydroxide, chloride, fluoride, bromide, iodide, nitrate, sulfate, and phosphate.

The quaternized aromatic heterocycle may be a multiple heterocycle containing at least two ring structures. The multiple ring structures may be fused together, wherein one or more of the at least two ring structures include at least one quaternized atom. Alternately, the multiple heterocycle may contain at least two ring structures joined by at least one atom which is part of the at least two ring structures, or at least two ring structures joined by at least one atom which is not part of the at least two ring structures. One or more of the at least two ring structures includes at least one quaternized atom.

Generally, suppressants useful herein may be based on heterocyclic aromatic compounds such as pyridine, pyrrolidine, imidazoline, pyrazoline, oxazoline, isoxazoline, triazoline, oxadiazoline, thiadiazoline, dithiazoline, diazines, oxazines, thiazines, triazines, indoles, isoindoles, benzimidazoles, purines, indazole, benzisoxazole, benzoxazole, benzothiazole, qunioline, isoquinoline, quinoxaline, acridine, pyrimidine, quinazoline, cinnoline, and phthalazine.

Non-limiting examples of suppressants include quaternized aromatic heterocycle selected from the group consisting of cetylpyridinium chloride, 1-butyl-3-methylpyridinium bromide, 1-butylpyridinium chloride, 1-methyl-3-hexylimidazolium chloride, 1-methyl-3-octylimidazolium chloride, 1-hexyl-3-methylimidazolium tetrafluoroborate, 1,4-dimethyl-1,2,4-triazolium chloride, 1-Ethyl-3-methylimidazolium acetate, 3-(2-Hydroxyethyl)thiazolium bromide, 2,3,3-Trimethyl-1-propyl-3H-indolium iodide, 1,2,3,3,-tetramethyl-3H-indolium iodide. Combinations of the foregoing may be used.

Method. The method according to the present invention comprises introducing a slurry composition between a polishing pad and a substrate that are pressed into contact and moving relative to each other, wherein the slurry composition comprises water (preferably deionized water), abrasive particles, and one or more polishing suppressant agents described above. The method of the invention can be used to planarize semiconductor substrate surfaces for integrated circuit manufacturing. In particular, the relevant substrate surfaces contain silica and polysilicon. The slurry composition used in the method can be any disclosed herein.

EXAMPLES

The invention is illustrated, and not limited, by the following examples.

Example 1

Table 1 shows the polish rates and selectivities of 8-inch diameter silica/polysilicon wafers using aqueous slurries containing 2 wt % ceria particles, with and without the presence of 0.01 wt % cetylpyridinium chloride, and pH adjusted by nitric acid or sodium hydroxide. The particle size $D_{mean}$ of the ceria particles in both slurry compositions is 0.125 micron. The polishing is performed using a Mirra polisher operated at 154 rpm top platen speed and 1.5 psi polishing pressure. The polishing pad is an IC 1000 pad.

It can be seen that for the slurries 1 and 2 with acidic pH (less than 4), the presence of cetylpyridinium chloride significantly increases the selectivity of the polish rate of silica over polysilicon by a factor of nearly 18 relative to the slurry without cetylpyridinium chloride. On the other hand, for the slurries 3 and 4 with basic pH (10.5), the selectivity is not significantly increased with the presence of cetylpyridinium chloride and is much less than 50. In addition, the polish rate is significantly reduced to an undesirable level.

TABLE 1

Polish rate and selectivity data of 8-inch diameter silica/polysilicon wafers using aqueous slurries containing 2 wt % ceria particles, with and without the presence of 0.01 wt % cetylpyridinium chloride, and pH adjusted with nitric acid or sodium hydroxide.

|  | Slurry 1 | Slurry 2 | Slurry 3 | Slurry 4 |
|---|---|---|---|---|
| Components wt % | | | | |
| Ceria | 2 | 2 | 2 | 2 |
| Cetylpyridinium Chloride | 0 | 0.01 | 0 | 0.01 |
| Nitric Acid | 0.004 | 0.004 | 0 | 0 |
| Sodium Hydroxide | 0 | 0 | 0.046 | 0.046 |
| Water | 97.996 | 97.986 | 97.954 | 97.944 |
| pH value | 3.9 | 3.8 | 10.5 | 10.5 |
| Removal rates; Å/sec | | | | |
| Silicon Dioxide | 102 | 91 | 75 | 47 |
| Polysilicon | 10 | 0.5 | 22 | 2.3 |
| Selectivity | 10.2 | 182 | 3.4 | 20.4 |

Removal rates in the table above are expressed in angstroms/second (Å/sec). The invention is further described with reference to the following items. It is noted that a multiply dependent item or claim such as "items 1-3" refers to any of claims 1-3.

Item 1. An acidic aqueous slurry composition comprising: abrasive particles selected from the group consisting of ceria, alumina, zirconia, silica, titania and combinations thereof; a sufficient amount of a pH adjuster to bring the slurry pH to below 4.5; and a cationic polishing suppressant comprising a quaternized aromatic heterocycle.

Item 2. The acidic aqueous slurry composition of item 1, wherein the pH adjuster is selected from the group consisting of nitric acid, hydrochloric acid, sulfuric acid, acetic acid, hydrobromic acid, formic acid, propionic acid, lactic acid, glycolic acid and combinations thereof.

Item 3. The acidic aqueous slurry composition of item 1, wherein the quaternized aromatic heterocycle includes 4-8 atoms, preferably 5 or 6 atoms.

Item 4. The acidic aqueous slurry composition of items 1-3, wherein the quaternized aromatic heterocycle includes at least one heteroatom capable of achieving a quaternary state.

Item 5. The acidic aqueous slurry composition of items 1-4, wherein the at least one heteroatom is nitrogen or phosphorus, preferably nitrogen.

Item 6. The acidic aqueous slurry composition of items 1-5, wherein the quaternized aromatic heterocycle further includes at least one saturated or unsaturated, optionally substituted C1 to C100 hydrocarbon residue bonded to at least one atom of the heterocycle.

Item 7. The acidic aqueous slurry composition of items 1-6 wherein the hydrocarbon residue has 1 to 24 carbon atoms.

Item 8. The acidic aqueous slurry composition of items 1-7, wherein the quaternized aromatic heterocycle is part of an ionic liquid.

Item 9. The acidic aqueous slurry composition of items 1-8 wherein at least one anion is associated with the quaternized aromatic heterocycle to provide electroneutrality to the composition, the anion selected from the group consisting of hydroxide, chloride, bromide, iodide, nitrate, sulfate, phosphate and combinations thereof.

Item 10. The acidic aqueous slurry composition of items 1-9, wherein the quaternized aromatic heterocycle wherein the quaternized aromatic heterocycle is a multiple heterocycle containing at least two ring structures.

Item 11. The acidic aqueous slurry composition of items 1-10, wherein the multiple heterocycle contains at least two ring structures fused together, wherein one or more of the at least two ring structures include at least one quaternized atom.

Item 12. The acidic aqueous slurry composition of items 1-10, wherein the multiple heterocycle contains at least two ring structures joined by at least one atom wherein the at least one atom is not part of the at least two ring structures, wherein one or more of the at least two ring structures include at least one quaternized atom.

Item 13. The acidic aqueous slurry composition of items 1-12, wherein the quaternized aromatic heterocycle is selected from the group consisting of:
cetylpyridinium chloride, 1-butyl-3-methylpyridinium bromide, 1-butylpyridinium chloride, 1-methyl-3-hexylimidazolium chloride, 1-methyl-3-octylimidazolium chloride, 1-hexyl-3-methylimidazolium tetrafluoroborate, 1,4-dimethyl-1,2,4-triazolium chloride, 1-Ethyl-3-methylimidazolium acetate, 3-(2-Hydroxyethyl)thiazolium bromide, 2,3,3-Trimethyl-1-propyl-3H-indolium iodide, 1,2,3,3,-tetramethyl-3H-indolium iodide, and combinations thereof.

Item 14. A method of polishing a silicon dioxide film in preference to polysilicon (polycrystalline silicon) comprising introducing an acidic aqueous slurry composition between a polishing pad and the substrate when the polishing pad and substrate are pressed into contact with each other and moving relative to each other, wherein the acidic aqueous slurry composition comprises:
abrasive particles selected from the group consisting of ceria, alumina, zirconia, silica, titania and combinations thereof;
a sufficient amount of a pH adjuster to bring the slurry pH to below 4.5; and a cationic polishing suppressant comprising a quaternized aromatic heterocycle.

Item 15. The method of item 14, wherein the pH adjuster is at least one selected from the group consisting of nitric acid, hydrochloric acid, sulfuric acid, acetic acid, hydrobromic acid, formic acid, propionic acid, lactic acid, and glycolic acid.

Item 16. The method of items 14-15, wherein the quaternized aromatic heterocycle includes 4-8 atoms, preferably 5 or 6 atoms.

Item 17. The method of items 14-16, wherein the quaternized aromatic heterocycle includes at least one heteroatom capable of achieving a quaternary state.

Item 18. The method of items 14-17, wherein the at least one heteroatom is nitrogen or phosphorus, preferably nitrogen.

Item 19. The method of items 14-18, wherein the quaternized aromatic heterocycle further includes at least one saturated or unsaturated, optionally substituted C1 to C100 hydrocarbon residue bonded to at least one atom of the heterocycle.

Item 20. The method of items 14-19, wherein the hydrocarbon residue has 1 to 24 carbon atoms.

Item 21. The method of items 14-20, wherein the quaternized aromatic heterocycle is part of an ionic liquid.

Item 22. The method of items 14-21, wherein at least one anion is associated with the quaternized aromatic heterocycle to provide electroneutrality to the composition, the anion selected from the group consisting of hydroxide, chloride, bromide, iodide, nitrate, sulfate, phosphate and combinations thereof, Item 23. The method of items 14-22, wherein the quaternized aromatic heterocycle is a multiple heterocycle containing at least two ring structures.

Item 24. The method of items 14-23, wherein the multiple heterocycle contains at least two ring structures fused together, wherein one or more of the at least two ring structures include at least one quaternized atom.

Item 25. The method of items 14-24, wherein the multiple heterocycle contains at least two ring structures joined by at least one atom wherein the at least one atom is not part of the at least two ring structures, wherein one or more of the at least two ring structures include at least one quaternized atom.

Item 26. The method of items 14-25, wherein the quaternized aromatic heterocycle is selected from the group consisting of: cetylpyridinium chloride, 1-butyl-3-methylpyridinium bromide, 1-butylpyridinium chloride, 1-methyl-3-hexylimidazolium chloride, 1-methyl-3-octylimidazolium chloride, 1-hexyl-3-methylimidazolium tetrafluoroborate, 1,4-dimethyl-1,2,4-triazolium chloride, 1-Ethyl-3-methylimidazolium acetate, 3-(2-Hydroxyethyl)thiazolium bromide, 2,3,3-Trimethyl-1-propyl-3H-indolium iodide, 1,2,3,3,-tetramethyl-3H-indolium iodide, and combinations thereof.

Item 27. The method of items 14-26, wherein the substrate surface includes silica and crystalline silicon, and where the polishing selectivity ratio of silica to crystalline silicon is at least at least 50, preferably at least 75, more preferably at least 100, even more preferably at least 150 and yet more preferably at least 175.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention claimed is:

1. A method of polishing a silicon dioxide film in preference to polycrystalline silicon comprising: introducing an acidic aqueous slurry composition between a polishing pad and a substrate including the silicon dioxide film and the polycrystalline silicon when the polishing pad and the substrate are pressed into contact with each other and moving relative to each other, wherein the acidic aqueous slurry composition comprises:
   abrasive particles selected from the group consisting of ceria, alumina, zirconia, titania and combinations thereof;
   an amount of a pH adjuster to bring the slurry pH to below 5; and
   a cationic polishing suppressant comprising a quaternized aromatic heterocycle, wherein the quaternized aromatic heterocycle is selected from the group consisting of cetylpyridinium chloride, 1-butyl-3-methylpyridinium bromide, 1-butylpyridinium chloride, 1-methyl-3-hexylimidazolium chloride, 1-methyl-3-octylimidazolium chloride, 1-hexyl-3-methylimidazolium tetrafluoroborate, 1,4-dimethyl-1,2,4-triazolium chloride, 1-Ethyl-3-methylimidazolium acetate, 3-(2-Hydroxyethyl)thiazolium bromide, 2,3,3-Trimethyl-1-propyl-3H-indolium iodide, 1,2,3,3,-tetramethyl-3H-indolium iodide, and combinations thereof.

2. The method of claim 1, wherein the pH adjuster is selected from the group consisting of nitric acid, hydrochloric acid, sulfuric acid, acetic acid, hydrobromic acid, formic acid, propionic acid, lactic acid, glycolic acid and combinations thereof.

3. The method of claim 1, wherein the quaternized aromatic heterocycle includes at least one heteroatom selected from the group consisting of nitrogen and phosphorus.

4. The method of claim 1, wherein the quaternized aromatic heterocycle further includes at least one saturated or unsaturated, optionally substituted hydrocarbon residue having 1 to 100 carbon atoms, the hydrocarbon residue bonded to at least one atom of the heterocycle.

5. The method of claim 1, wherein the quaternized aromatic heterocycle is part of an ionic liquid.

6. The method of claim 1, wherein at least one anion is associated with the quaternized aromatic heterocycle to provide electroneutrality to the composition, the anion selected from the group consisting of hydroxide, chloride, bromide, iodide, nitrate, sulfate, phosphate and combinations thereof.

7. The method of claim 1, wherein the quaternized aromatic heterocycle is a multiple heterocycle containing at least two ring structures.

8. The method of claim 7, wherein the multiple heterocycle contains at least two ring structures fused together, wherein at least one of the at least two ring structures includes at least one quaternized atom.

9. The method of claim 7, wherein the multiple heterocycle contains at least two ring structures joined by at least one atom wherein the at least one atom is not part of the at least two ring structures, wherein one or more of the at least two ring structures include at least one quaternized atom.

* * * * *